(12) United States Patent
Gao

(10) Patent No.: US 10,816,676 B2
(45) Date of Patent: Oct. 27, 2020

(54) GNSS/INS INTEGRATION DEEP INSIDE OF INERTIAL SENSORS

(71) Applicant: UTI Limited Partnership, Calgary (CA)

(72) Inventor: Yang Gao, Calgary (CA)

(73) Assignee: UTI Limited Partnership, Calgary (CA)

(*) Notice: Subject to any disclaimer, the term of this patent is extended or adjusted under 35 U.S.C. 154(b) by 253 days.

(21) Appl. No.: 15/905,751

(22) Filed: Feb. 26, 2018

(65) Prior Publication Data

US 2018/0299563 A1 Oct. 18, 2018

Related U.S. Application Data

(60) Provisional application No. 62/463,644, filed on Feb. 25, 2017.

(51) Int. Cl.
| | |
|---|---|
| *G01S 19/47* | (2010.01) |
| *G01S 19/49* | (2010.01) |
| *G01C 21/00* | (2006.01) |
| *G01C 21/16* | (2006.01) |

(52) U.S. Cl.
CPC ............. *G01S 19/47* (2013.01); *G01C 21/00* (2013.01); *G01C 21/165* (2013.01); *G01S 19/49* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0254729 | A1* | 10/2011 | Dutta | G01C 21/165 |
| | | | | 342/357.3 |
| 2015/0094089 | A1* | 4/2015 | Moeglein | H04W 4/029 |
| | | | | 455/456.1 |
| 2017/0212248 | A1* | 7/2017 | Bobye | G01C 21/165 |
| 2018/0180416 | A1* | 6/2018 | Edelman | G01C 11/02 |
| 2018/0217270 | A1* | 8/2018 | Vasilyuk | G01C 17/02 |
| 2018/0239030 | A1* | 8/2018 | Chen | G01S 19/41 |
| 2018/0259333 | A1* | 9/2018 | Toda | G01C 17/02 |
| 2019/0038960 | A1* | 2/2019 | Roberts | A63C 19/065 |
| 2019/0094344 | A1* | 3/2019 | Steinmann | G01S 7/4808 |
| 2019/0104493 | A1* | 4/2019 | Hedley | G01S 5/0205 |

\* cited by examiner

*Primary Examiner* — Mamadou L Diallo
(74) *Attorney, Agent, or Firm* — Brion Raffoul

(57) ABSTRACT

Embodiments of systems and methods for GNSS and INS integration are described In an embodiment, the method includes receiving a GNSS signal from a GNSS signal source at an antenna coupled to a GNSS receiver. The method may also include generating GNSS data in response to the GNSS signal. Additionally, the method may include communicating the GNSS data to an INS system. The method may also include generating an IMU signal with an IMU sensor. The method may further include generating IMU data in response to the IMU signal. Also, the method may include integrating the IMU data with the GNSS data in a navigation processing unit of an INS. The method may further include generating INS data in response to the integrated IMU data and the GNSS data.

16 Claims, 8 Drawing Sheets

GNSS/INS INTEGRATION DEEP INSIDE OF INERTIAL SENSORS

FIELD

This disclosure relates generally to navigation systems, and more specifically, to Global Navigation Satellite System (GNSS) and Inertial Navigation System (INS) Integration.

BACKGROUND

GNSS has become the most widely used location sensor for a wide range of applications. However, GNSS is technically limited in environments prone to signal attenuation and signal blockage that would deteriorate its overall accuracy. On the other hand, INS, which contains IMU (Inertial Measurement Unit) as a main component, is a self-contained navigation system with superior accuracy over a short time period. But INS cannot operate as a stand-alone navigation system due to sensor biases that would deteriorate the long-term accuracy of the system especially for low-cost MEMS (Micro-Electro-Mechanical System) based IMUs. FIGS. 1 and 2 show the main elements of a GNSS receiver and an INS, respectively. In INS, the IMU supplies inertial measurements, typically of angular rate and specific force, to the navigation processing in which the position, velocity and attitude are solved.

FIG. 1 illustrates an example of a GNSS receiver 104. The GNSS receiver 104 may be coupled to an antenna 102. The GNSS receiver 104 may include a front end 106 for handling incoming GNSS signals from the antenna 102, a GNSS signal processor 108 for processing GNSS signals, a clock 112 for providing timing to the GNSS signal processor 108, and a navigation processor 110 for converting the GNSS data provided by the GNSS processor 108 into navigation data.

FIG. 2 illustrates an example of an INS 202. The INS 202 includes an IMU 204. The IMU 204 often includes accelerometers 208, gyroscopes 210, temperatures sensors 212, and the like. An IMU signal processor 214 may receive signals from the sensors and generate IMU data in response to a clock signal provided by the clock 212. The IMU may send IMU data to the navigation processor 206 which converts the IMU data into navigation data.

SUMMARY

Embodiments of systems and methods for GNSS and INS integration are described In an embodiment, the method includes receiving a GNSS signal from a GNSS signal source at an antenna coupled to a GNSS receiver. The method may also include generating GNSS data in response to the GNSS signal. Additionally, the method may include communicating the GNSS data to an INS system. The method may also include generating an IMU signal with an IMU sensor. The method may further include generating IMU data in response to the IMU signal. Also, the method may include integrating the IMU data with the GNSS data in a navigation processing unit of an INS. The method may further include generating INS data in response to the integrated IMU data and the GNSS data.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of systems and methods for GNSS and INS integration are described. The present embodiments present a new scheme for GNSS and INS integration, which extends current GNSS/INS integrations inside of the IMU sensor to have the INS integration conducted in the IMU signal domain. Such embodiments enable new processes for multi-sensor integration with INS and GNSS. An integrated GNSS/INS system based on the present embodiments may improve the performance of the IMU sensor and the GNSS receiver, particularly for low-cost and small size MEMS IMU and GNSS chipsets, as well as the performance of the integrated navigation solutions. Additionally, the present embodiments describe a new concept for designing inertial sensors which will consider deep integration of the IMU sensor with other sensors. Current IMU sensors are largely a black box sensor unit with no consideration of integration with other sensor in the signal domain. This present embodiments, for example, can make the IMU sensor configurable to enhance IMU sensor performance (precision, dynamics, availability etc.), particularly for low-cost and small size MEMS IMU. An integrated GNSS/INS system based on the present embodiments may reduce inertial error calibration complexity and enhance calibration performance of current integrated GNSS/INS systems. Additionally, an integrated GNSS/INS system based on the present embodiments can improve integration filter robustness to large inertial errors. Also, the present embodiments may help bring inertial navigation systems to a wide range of new applications.

Figure 1:
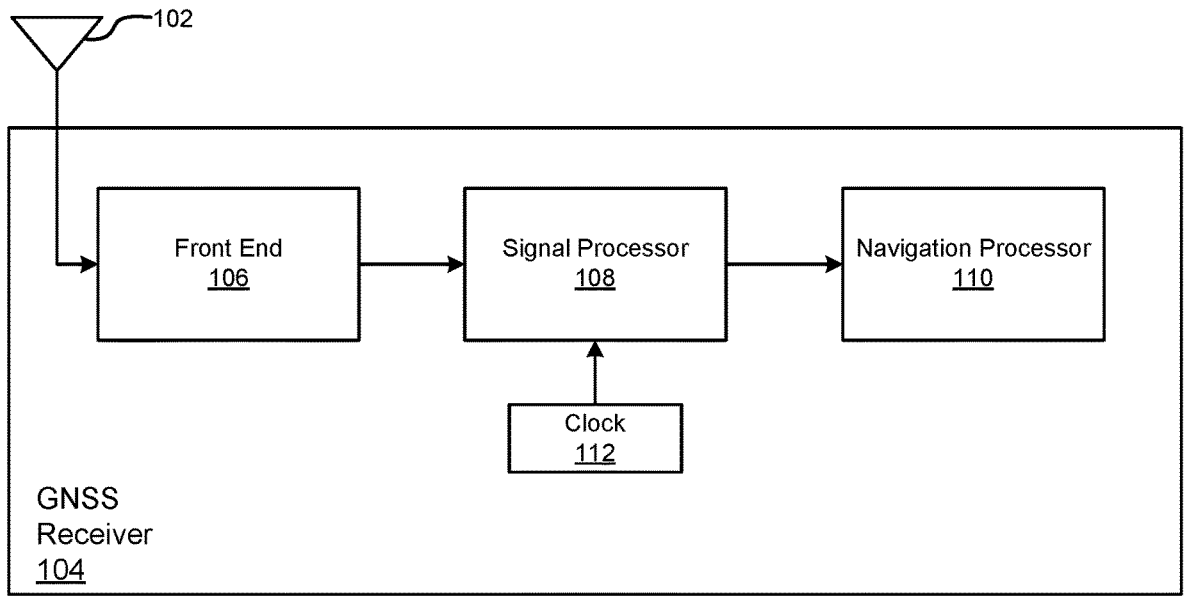
FIG. 1 is a schematic block diagram illustrating one embodiment of a GNSS receiver according to the prior art.
Figure 2:
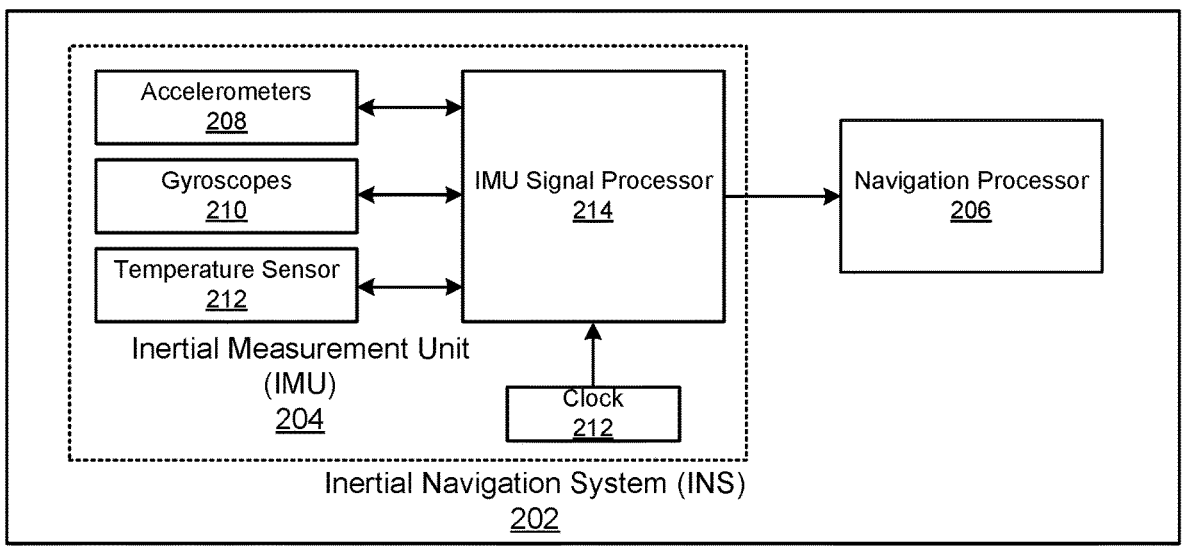
FIG. 2 is a schematic block diagram illustrating one embodiment of an INS according to the prior art.
Figure 3:
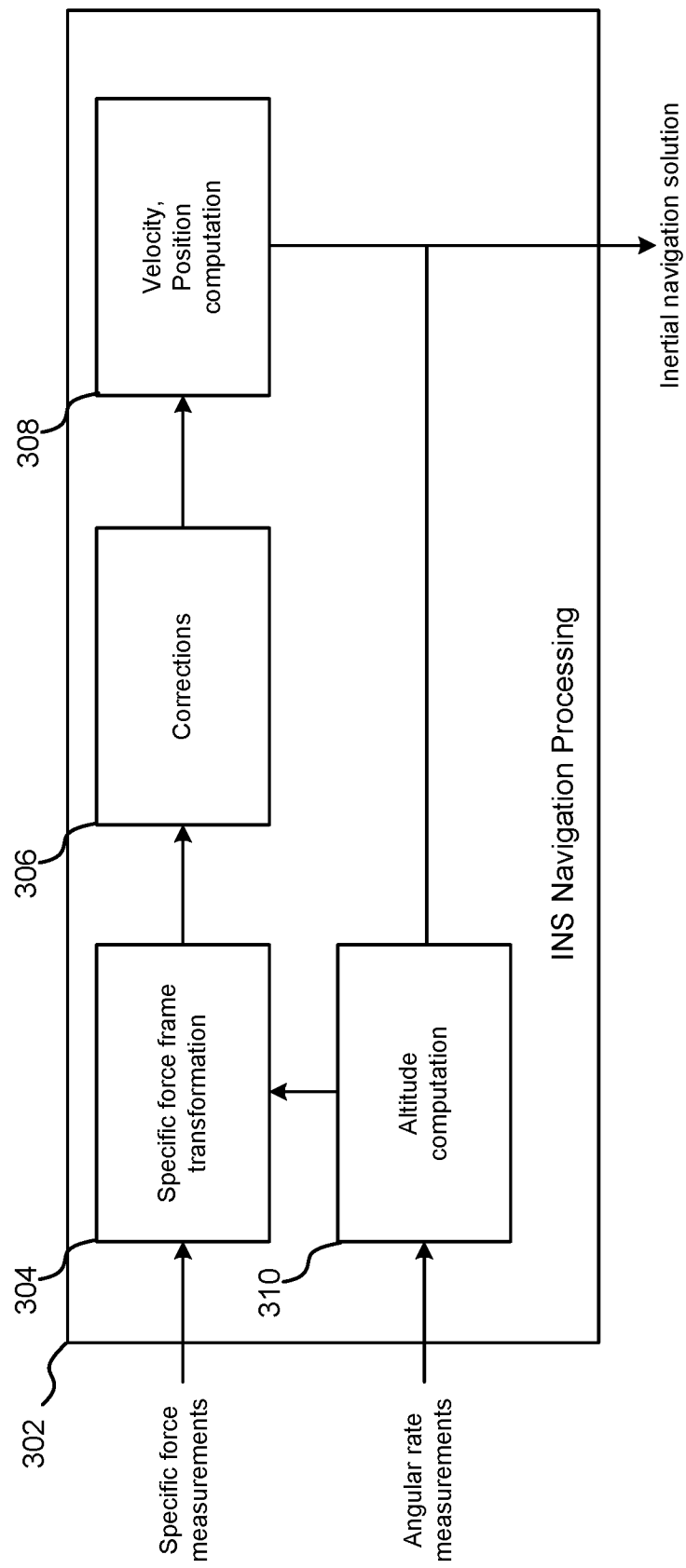
FIG. 3 is a process flow diagram illustrating one embodiment of an INS navigation process.

FIG. 3 shows functional elements of navigation processing in INS 202. INS navigation processes as represented by block 302, include specific force frame transformation 304, corrections 306, velocity and position computation 308, and attitude computation 310. The result When these processes are performed on specific force measurements and angular rate measurements, an inertial navigation solution may be generated. As two complementary location technologies, INS biases can be calibrated by the GNSS signals and GNSS navigation signal outages can be mitigated by the INS 202. GNSS/INS integration therefore can leverage the advantages of each positioning system and the benefits include improved availability (bridging over GNSS navigation signal outages), reliability to reject data with outliers (cycle slips, multipath), and robustness of signal processing (weak signals, jamming).

Figure 4:
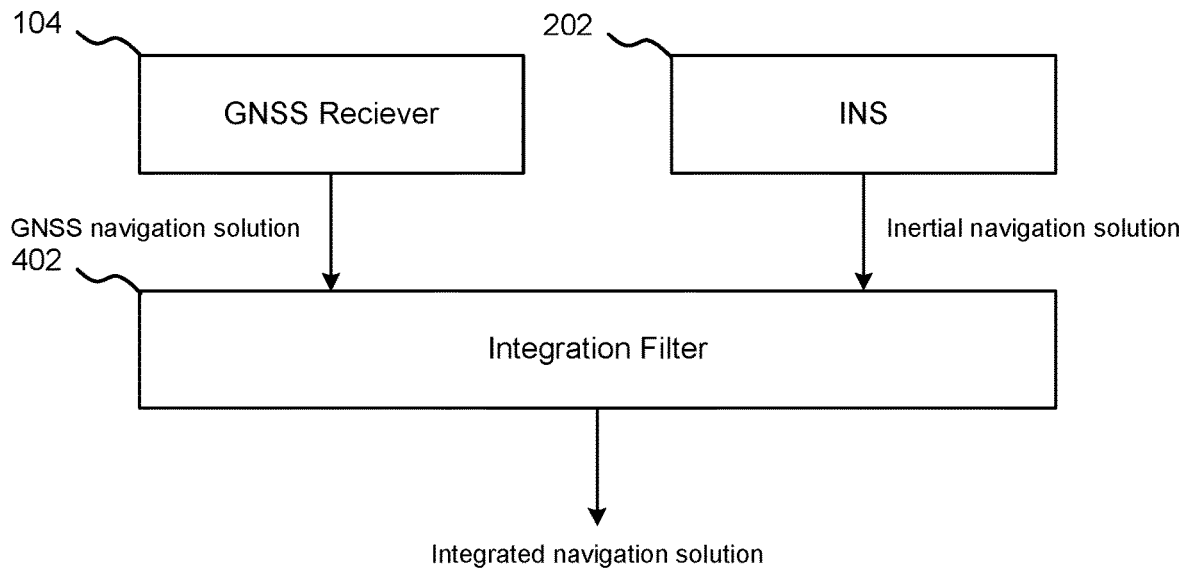
FIG. 4 is a schematic block diagram illustrating one embodiment of a loosely coupled GNSS/INS integration in the position domain.
Figure 5:
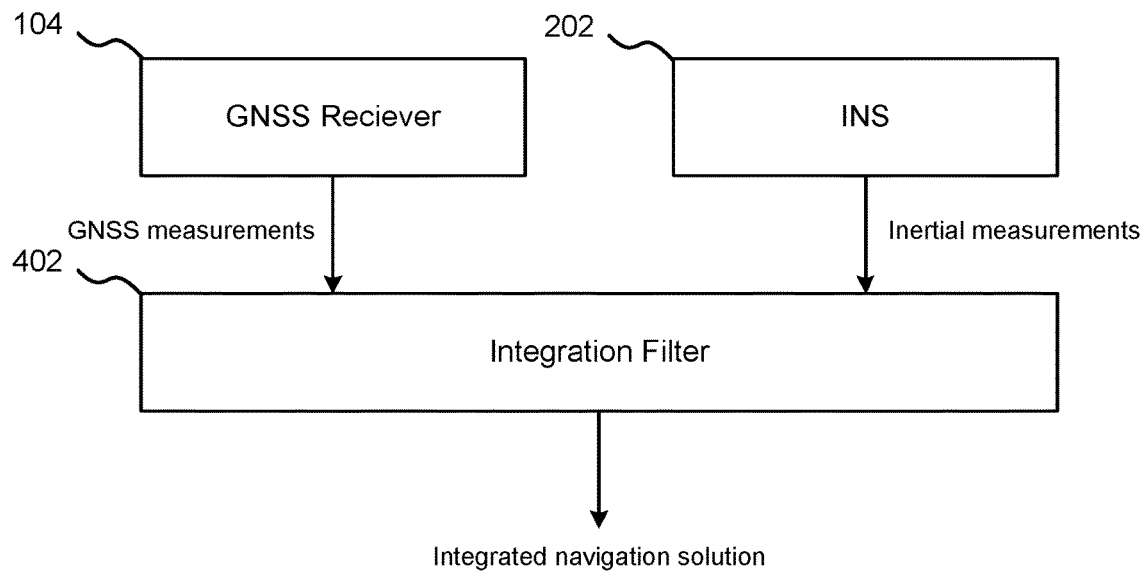
FIG. 5 is a schematic block diagram illustrating one embodiment of a tightly coupled GNSS/INS integration in the measurement domain.
Figure 6:
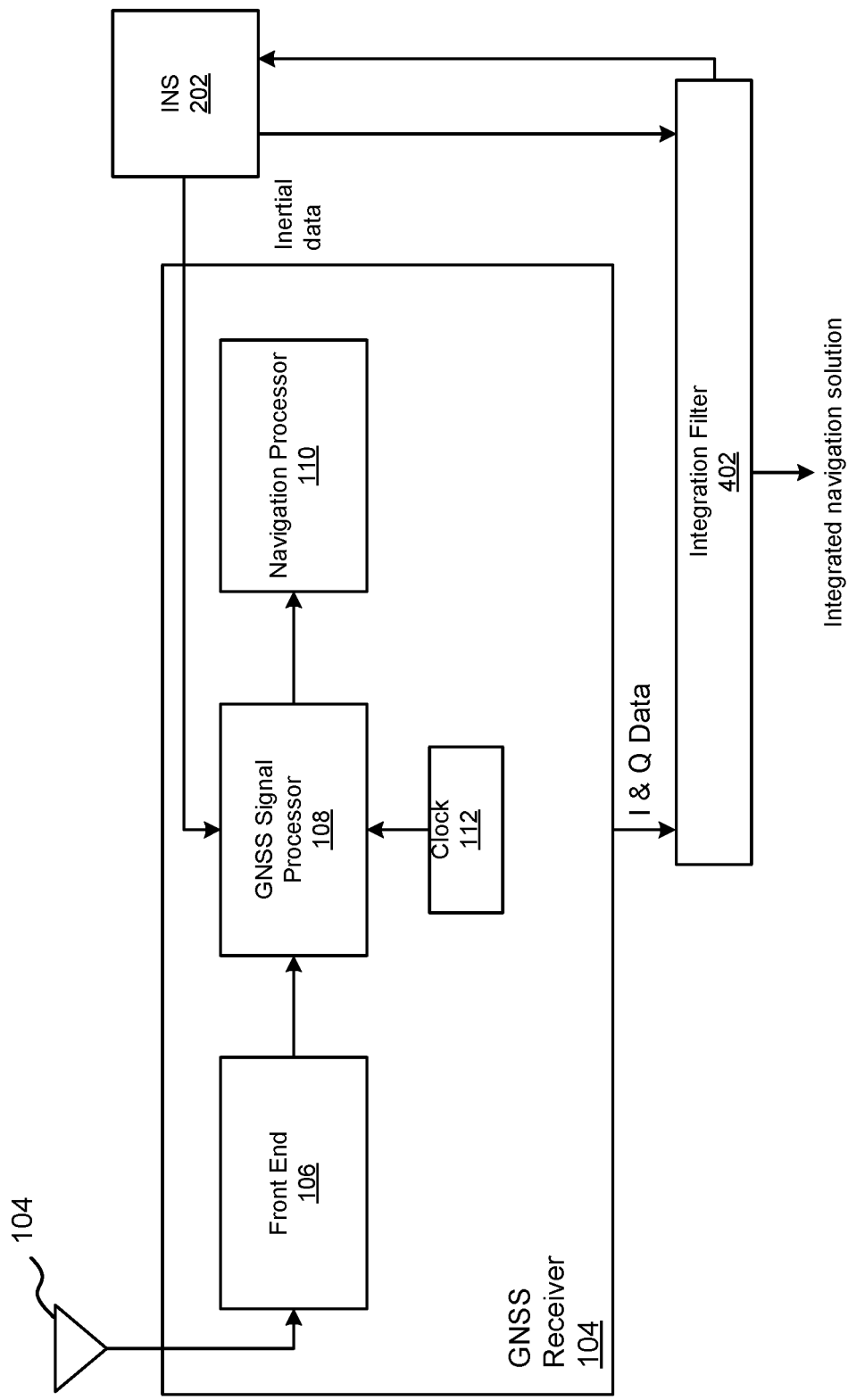
FIG. 6 is a schematic block diagram illustrating one embodiment of an ultra-tightly coupled GNSS/INS integration in the GNSS signal domain.

GNSS and inertial sensor data fusion algorithms and integrated GNSS/INS systems are categorized into three different types: a) loosely coupled GNSS/INS, b) tightly coupled GNSS/INS, and c) ultra-tightly coupled GNSS/INS. FIGS. 4, 5 & 6 show the loosely, tightly and ultra-tightly coupled GNSS/INS integration schemes, respectively.

A loosely coupled GNSS/INS system, as shown in FIG. 4 integrates the position solutions from GNSS and INS systems using an integration filter 402. In such an embodiment, the integration filter 402 may be coupled to both the GNSS receiver 104 and the INS 202 and receive GNSS navigation solutions from the GNSS receiver 104 and inertial navigation solutions from the INS 202.

A tightly couple GNSS/INS system, as shown in FIG. 5, integrates the measurements from GNSS and INS, rather than the previously processed solutions. The integration filter 402 may use the GNSS measurements and the inertial measurements in combination to generate an integrated navigation solution. Such an embodiment may be referred to as measurement domain integration.

An ultra-tightly coupled GNSS/INS system, as shown in FIG. 6 does one more operation than the loosely and tightly coupled GNSS/INS integrations: it extends the integration of GNSS inside of the GNSS receiver 104 and makes the integration be conducted in the GNSS signal domain.

In a further embodiment, GNSS/INS integration methods may include GNSS/INS integrations into inside of the IMU 204 to have the INS integration conducted in the IMU signal domain. The signal processing in an IMU 204 includes sensor control, compensation, measurement generation and various other tasks that would benefit from integration with other sensors such as GNSS.

Figure 7:
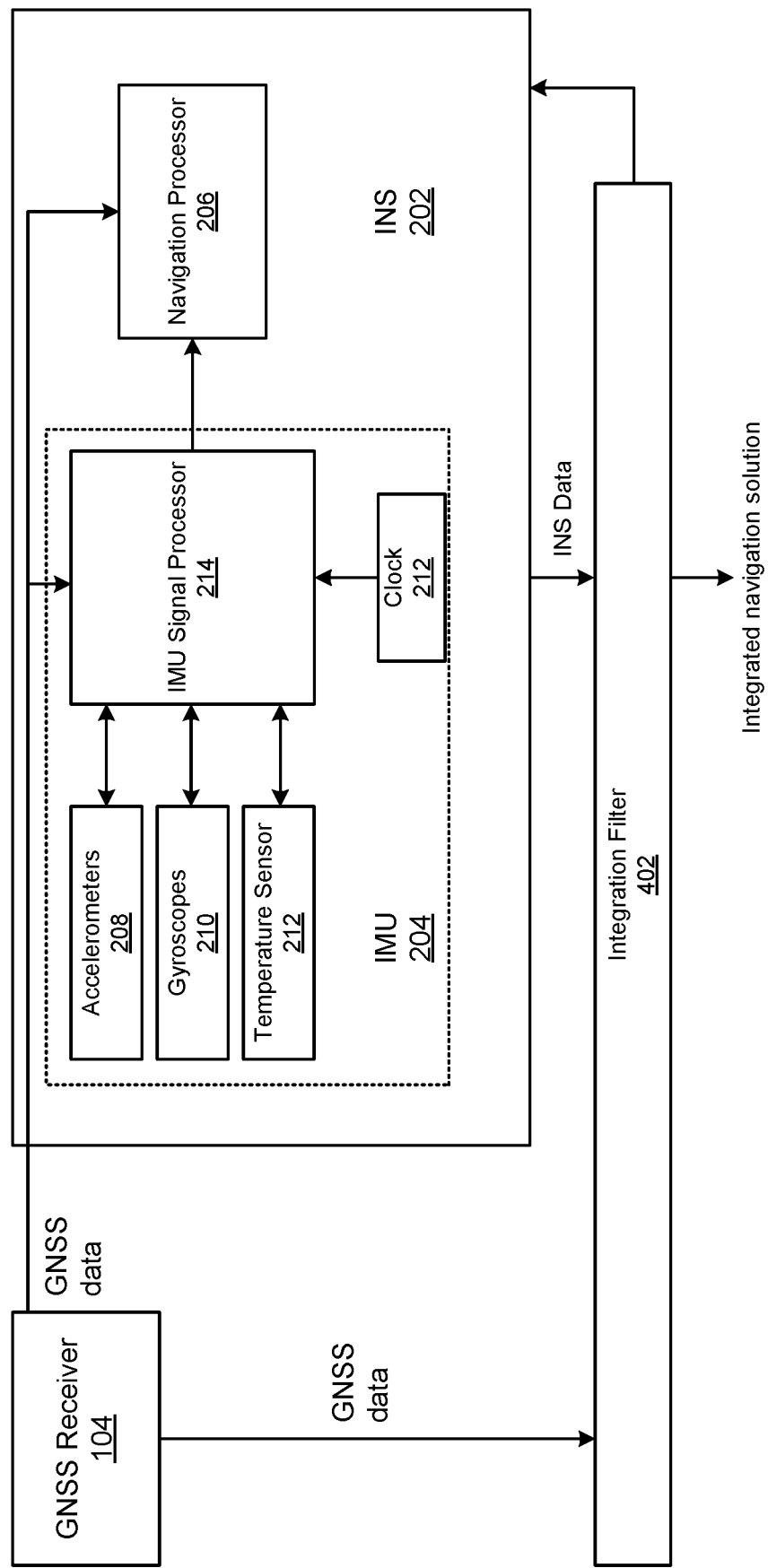
FIG. 7 is a schematic block diagram illustrating one embodiment of a system for integration of GNSS data deep inside of the IMU.
Figure 8:
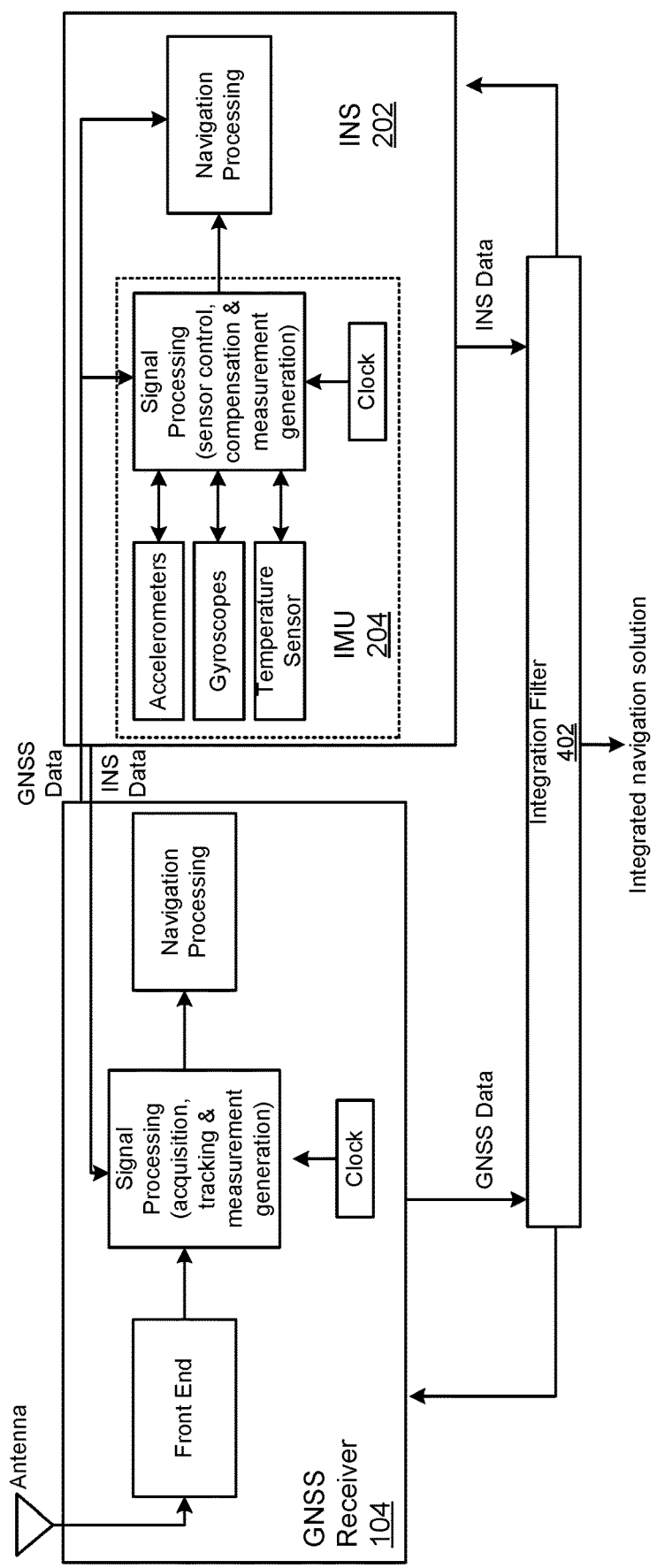
FIG. 8 is a schematic block diagram illustrating one embodiment of a system for integrating GNSS data with INS data deep inside of the GNSS receiver and IMU.
Figure 9:
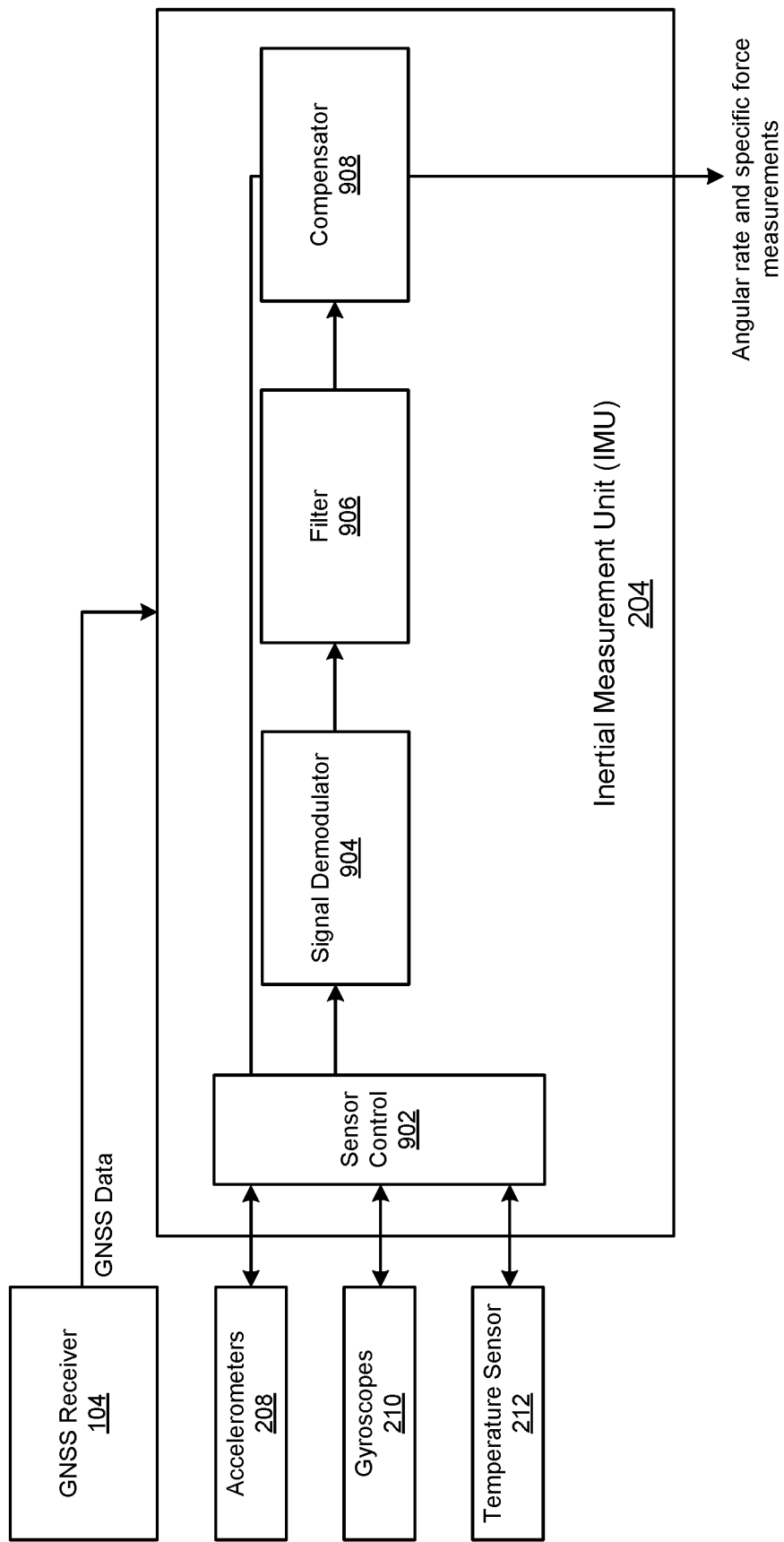
FIG. 9 is a schematic block diagram illustrating one embodiment of a system for integrating of GNSS data with IMU data deep inside of an IMU signal processor.

FIG. 7 shows the an embodiment of a GNSS/INS integration system. When the GNSS data is in the position domain, the integration results in a loosely-coupled GNSS with INS integration deep inside of the IMU 204. When the GNSS data is in the measurement domain, the integration results in a tightly-coupled GNSS with INS integration deep inside of the IMU sensor. When the GNSS data is in the signal domain, the integration results in an ultra-tightly coupled GNSS with INS integration deep inside of the IMU 204, as shown in FIG. 8. The functional elements of the signal processing in the IMU 204 include sensor control 902, signal demodulation 904, signal filtering 906, and compensation 908, as shown in FIG. 9.

The integration with GNSS data within the signal processing of IMU 204 can be made to signal demodulation, filtering and compensation for performance improvement, e.g. increase of demodulation stability and decrease of compensation residual errors. This leads to more precise inertial measurements with higher stability and availability. Further, the present embodiments may also reduce the error modeling efforts for navigation processing. In certain embodiments, the GNSS data to the IMU 204 and the integration filter are not necessarily the same which can create more variations for embodiments of integration processes and systems. The present embodiments are not limited to GNSS integration with INS. Indeed, any other sensors could be used instead of GNSS for integration with INS.

Figure 10:
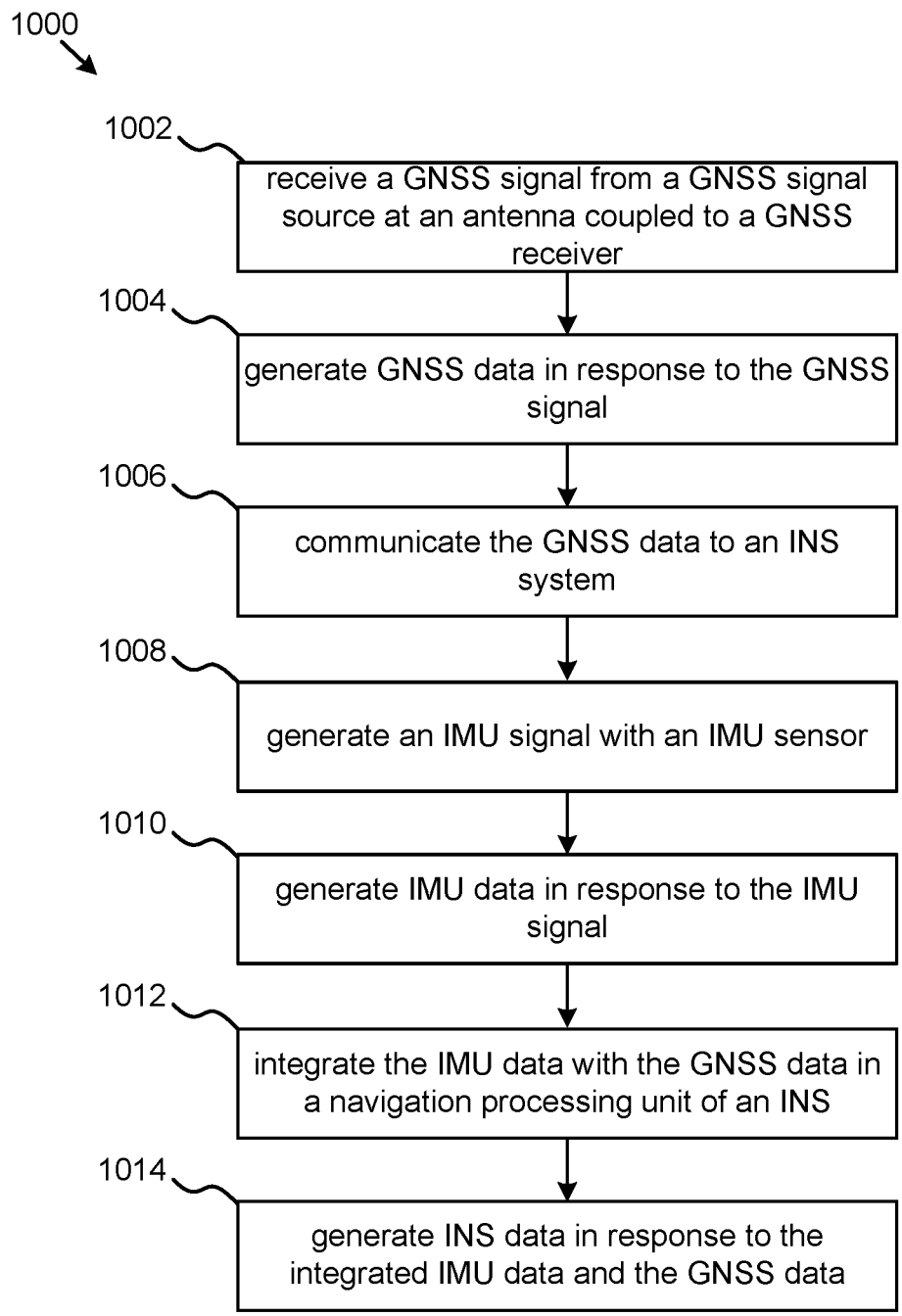
FIG. 10 is a schematic flowchart diagram illustrating one embodiment of a method for GNSS and IMU integration.

FIG. 10 illustrates one embodiment of a method for GNSS and INS integration. In an embodiment, the method 1000 includes receiving a GNSS signal from a GNSS signal source at an antenna coupled to a GNSS receiver as shown at block 1002. The method 1000 may also include generating GNSS data in response to the GNSS signal as shown at block 1004. Additionally, the method 1000 may include communicating the GNSS data to an INS system as shown at block 1006. The method 1000 may also include generating an IMU signal with an IMU sensor as shown at block 1008. The method may further include generating IMU data in response to the IMU signal as shown at block 1010. Also, the method 1000 may include integrating the IMU data with the GNSS data in a navigation processing unit of an INS as shown at block 1012. The method 1000 may further include generating INS data in response to the integrated IMU data and the GNSS data as shown at block 1014.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that the present embodiments are merely illustrative and are not intended to limit the scope of the disclosure described herein. In particular, any navigation system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
    receiving a Global Navigation Satellite System (GNSS) signal from a GNSS signal source at an antenna coupled to a GNSS receiver;
    generating GNSS data in response to the GNSS signal;
    communicating the GNSS data to an Inertial Navigation System (INS) system;
    generating an Inertial Measurement Unit (IMU) signal with an IMU sensor;
    generating IMU data in response to the IMU signal;
    integrating the IMU data with the GNSS data in an IMU signal processing unit of an INS; and
    generating INS data in response to the integrated IMU data and GNSS data.

2. The method of claim 1, further comprising:
    communicating the INS data to the GNSS receiver; and
    integrating the INS data with the GNSS signal to generate GNSS data.

3. The method of claim 1, further comprising integrating the INS data and the GNSS data with an integration filter.

4. The method of claim any one of claim 1, wherein the navigation processing unit is configured to integrate the IMU data and the GNSS data in the signal domain.

5. The method of any one of claim 1, wherein the integration generates a loosely-coupled GNSS with INS integration in the IMU processor when the GNSS data is in the position domain.

6. The method of any one of claim 1, wherein the integration generates a tightly-coupled GNSS with INS integration in the IMU processor when the GNSS data is in the measurement domain.

7. The method of any one of claim 1, wherein the integration generates an ultra-tightly-coupled GNSS with INS integration in the IMU processor when the GNSS data is in the signal domain.

8. The method of any one of claim 1, wherein IMU sensor is configurable to enhance IMU sensor performance (precision, dynamics, availability etc.), particularly for low-cost and small size MEMS IMU.

9. A system, comprising:
    a GNSS Global Navigation Satellite System (GNSS) receiver configured to:
    receive a GNSS signal from a GNSS signal source at an antenna coupled to the GNSS receiver;
    generate GNSS data in response to the GNSS signal;
    communicate the GNSS data to an Inertial Navigation System (INS) system; and
    an INS system coupled to the GNSS receiver, the INS system configured to:
    generate an Inertial Measurement Unit (IMU) signal with an IMU sensor;
    generate IMU data in response to the IMU signal;
    integrate the IMU data with the GNSS data in an IMU signal processing unit of an INS; and
    generate INS data in response to the integrated IMU data and GNSS data.

10. The system of claim 9, further comprising an integration filter coupled to the GNSS receiver and to the INS and configured to integrate the INS data and the GNSS data.

11. The system of claim 9, further configured to:
    communicate the INS data to the GNSS receiver; and
    integrate the INS data with the GNSS signal to generate GNSS data.

12. The system of claim 9, wherein the navigation processing unit is configured to integrate the IMU data and the GNSS data in the signal domain.

13. The system of claim 9, wherein the integration generates a loosely-coupled GNSS with INS integration in the IMU processor when the GNSS data is in the position domain.

14. The system of claim 9, wherein the integration generates a tightly-coupled GNSS with INS integration in the IMU processor when the GNSS data is in the measurement domain.

15. The system of claim 9, wherein the integration generates an ultra-tightly-coupled GNSS with INS integration in the IMU processor when the GNSS data is in the signal domain.

16. The system of claim 9, wherein IMU sensor is configurable to enhance IMU sensor performance (precision, dynamics, availability etc.), particularly for low-cost and small size MEMS IMU.

* * * * *